United States Patent
Jansing et al.

[11] Patent Number: 5,942,348
[45] Date of Patent: Aug. 24, 1999

[54] FUEL CELL WITH CERAMIC-COATED BIPOLAR PLATES AND A PROCESS FOR PRODUCING THE FUEL CELL

[75] Inventors: Thomas Jansing, Nürnberg; Thomas Martens, Walsdorf, both of Germany

[73] Assignee: Siemens Aktiengesellschaft, Munich, Germany

[21] Appl. No.: 08/867,113

[22] Filed: Jun. 2, 1997

Related U.S. Application Data

[63] Continuation of application No. PCT/DE95/01695, Nov. 30, 1995.

[30] Foreign Application Priority Data

Dec. 1, 1994 [DE] Germany ............................ 44 42 624

[51] Int. Cl.$^6$ .................................................. H01M 8/12
[52] U.S. Cl. ............................. 429/32; 429/39; 427/115; 264/618
[58] Field of Search .................... 429/32, 35, 38, 429/39; 427/115; 264/605, 618

[56] References Cited

U.S. PATENT DOCUMENTS

| | | | |
|---|---|---|---|
| 4,743,519 | 5/1988 | Kaji et al. .............. | 429/35 X |
| 4,857,420 | 8/1989 | Maricle et al. .......... | 429/32 X |
| 5,151,334 | 9/1992 | Fushimi et al. .......... | 429/32 |
| 5,750,279 | 5/1998 | Carolan et al. .......... | 429/32 |

FOREIGN PATENT DOCUMENTS

| | | |
|---|---|---|
| 0426265A3 | 5/1991 | European Pat. Off. . |
| 0578855A1 | 1/1994 | European Pat. Off. . |
| 0620608A1 | 10/1994 | European Pat. Off. . |
| 4004271A1 | 8/1990 | Germany . |
| 3935722A1 | 5/1991 | Germany . |
| 4009138A1 | 9/1991 | Germany . |
| 4011079A1 | 10/1991 | Germany . |
| 4237602A1 | 5/1994 | Germany . |
| 4410711C1 | 9/1995 | Germany . |

OTHER PUBLICATIONS

Japanese Patent Abstract No. 1–197972 (Kawada), dated Aug. 9, 1989.

Japanese Patent Abstract No. 61–267268 (Fujita), dated Nov. 26, 1986.

*Primary Examiner*—Stephen Kalafut
*Attorney, Agent, or Firm*—Herbert L. Lerner; Laurence A. Greenberg

[57] ABSTRACT

A high-temperature fuel cell has a solid electrolyte between metal plates. The surfaces of the metal plates are at least partly coated with stabilized zirconium oxide or a similar firmly adhering gas-tight ceramic with crystal structure. The coating reduces the gap between the plates at the edge of the fuel cell and makes it possible to fill the reduced gap with a glass solder green foil or a similar solder material which forms a gas-tight lateral seal for the fuel cell during the assembly of the fuel cell. The plates are also insulated from one another. The gas conduits formed in the plates for the aggressive reaction gases may also be protected against attack by the reaction gases with a thin coating of the same material.

22 Claims, 4 Drawing Sheets

FUEL CELL WITH CERAMIC-COATED BIPOLAR PLATES AND A PROCESS FOR PRODUCING THE FUEL CELL

CROSS-REFERENCE TO RELATED APPLICATION

This is a continuation of our international application PCT/DE95/01695, filed Nov. 30, 1995.

BACKGROUND OF THE INVENTION

Field of the Invention

The invention relates to a fuel cell with at least one active chamber and an oxide solid electrolyte. The active chamber is formed by a pair of electrically conductive plates which are disposed one above the other, are divided by an ion-conducting active layer structure into sub-chambers lying one above the other and being closed off from one another, and which are surrounded by an outer assembly region. The active chamber is closed off laterally in gas-tight fashion by insulating segments, the insulating segments being arranged in the outer assembly region and keeping the plates spaced apart from one another. Further, the surface of the plates is profiled in the region of the active chamber and forms contact segments each of which one electrode face of the ion-conducting active layer structure rests, and gas conduits, through which a reactive gas can be fed through each of the two sub-chambers. Such a fuel cell is described in German patent disclosure DE-A-42 37 602 (PCT/DE93/01017), the disclosure of which is herein incorporated by reference. The invention pertains in particular to a high-temperature fuel cell having a solid electrolyte of ion-conducting oxide (so-called solid oxide fuel cell, SOFC), and also to a method for coating the metallically conductive plates used in a cell of that type, and to a method for producing the cell.

Many prior art fuel cells are tubular in shape. However, fuel cell with a planar layer structure reach an energy density which is substantially higher (according to current experience, about 1 MW/m3). The energy generation is in this case based on the controlled chemical conversion of oxygen ions and hydrogen into water, i.e., on the so-called cold hydrogen-oxygen reaction, which respectively takes place in an active chamber which is divided by an active layer structure into two sub-chambers lying above one another. A hydrogen-containing gas (for example hydrogen), a gas mixture ($H_2/CO/CO_2$) produced from conventional hydrocarbon fuels, or a mixture ($H_2/CO/CH_4$) produced by reforming natural gas, flows through one of the sub-chambers, while an oxygen-containing gas, for example oxygen or air, flows through the other sub-chamber.

The invention herein starts out from a high-temperature fuel cell as described in DE-A-42 37 602. The most important constituent of the active layer structure is a layer of an electrolyte. The electrolyte surface respectively adjoining the sub-chambers lying above and below is designed as an electrode whose electrode potentials are tapped via contact segments of electrically conductive plates which lie opposite the electrolyte surfaces. By series connection of a plurality of active chambers of this type, bounded above and below by electrically conductive plates, the potential differences across the individual electrolyte layers can be added to form considerable voltages.

Figure 1:
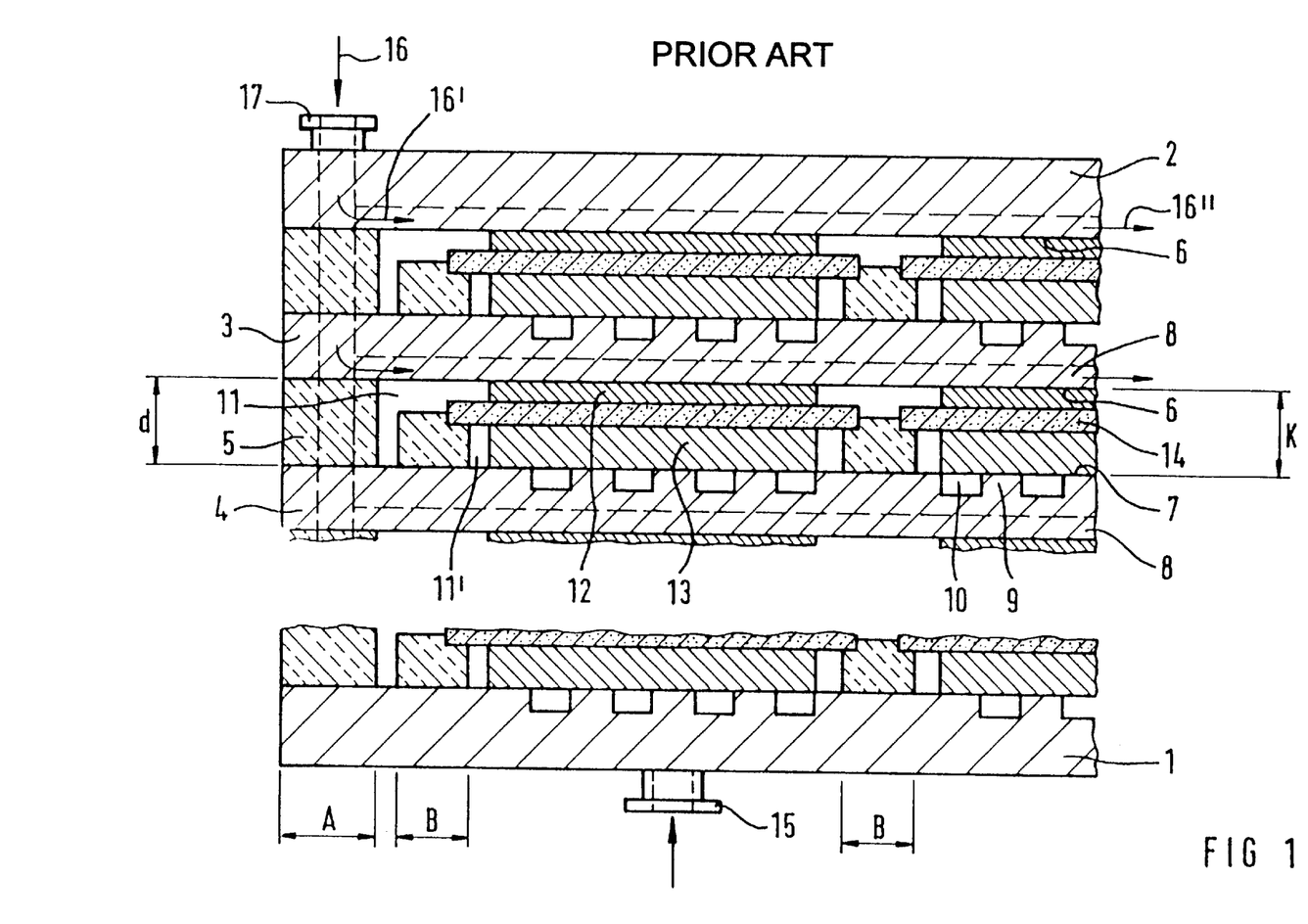
FIG. 1 is a diagrammatic sectional view of the above-described prior art fuel cell.

The following description of the prior art fuel cell refers to FIG. 1, in which there is shown the basic structure of a sandwich of this type, covered by a metallically conductive base plate 1 and cover plate 2. The prior art fuel cell has the following features:

each pair of metallically conductive plates 3, 4, which are disposed one above the other, form therebetween an active chamber K surrounded by an outer assembly region A. The active chamber is subdivided by an ion-conducting active layer structure (for example a plate 14 made of the above-mentioned solid electrolyte, and one electrode layer 12, 13 on each side of the electrolyte plate) into two sub-chambers 11, 11'. The subchambers 11, 11' lie one above the other and are closed off from one another;

the active chamber K is closed off laterally in a gas-tight fashion by insulating segments 5. The insulating segments 5 are disposed in the outer assembly region A and they maintain a distance d between the plates 3, 4; and the surfaces 6, 7 of the plates 3, 4, respectively, are profiled in the region of the active chamber K and they form contact segments 8, 9, which are abutted by the active layer structure with are respective electrode face 12, 13.

In the case of an impermeable solid, the total electrical conductivity $\lambda_{total}$ can be divided into a "metallic" conductivity $\lambda_{el}$, which depends on the electrons in the conduction band of the solid, whose high mobility decreases with increasing temperature, and an ion conductivity $\lambda_{ion}$, the basis of which is the restricted mobility of ions in the solid (in the case of an oxidic solid electrolyte: $O^{2-}$) and increases with increasing temperature:

$$\lambda_{total}=\lambda_{el}+\lambda_{ion}$$

The partial conductivities $\lambda_{el}$ and $\lambda_{ion}$ are described by the concentration of the corresponding charge carriers and by "transport numbers" $t_{el}$ and $t_{ion}$ which depend on the value of the charges and their mobility within the crystal structure of the solid.

For fuel cells, it is important for the oxygen and the hydrogen supplied to the separate sub-chambers to be ionized by electron exchange with the correspondingly charged electrodes of the chambers. During the formation of $H^+$, electrons are donated to the electrode of the corresponding sub-chamber and are discharged via the corresponding plate before—on the other side of the plate—either being given up to form $O^{2-}$ or being tapped as a current in a load circuit connected to the cell. The electrolyte layer thereby allows the ions to combine and form $H_2O$ through ion migration.

It is therefore necessary, with a view to construction, for the plates between individual active chambers to seal these chambers against diffusion of the reaction gases and the ions. In physical terms, at least the plates 3, 4 which lie between the base plate 1 and the cover plate 2 and respectively separate two neighboring chambers, must have a high electron conductivity in order to permit the formation of $H^+$ in the sub-chamber of one of the chambers, and simultaneously the formation of $O^{2-}$ in the sub-chamber of the other chamber. They are therefore referred to as bipolar plates (BIP). Exactly the opposite is true for the material of the electrolyte layer: it must have a low electron conductivity, so that the ionization potential is sustained at the electrodes, but must permit the requisite migration of the ions. Thus, as regards the ratio of the transport numbers for electrons and ions, which characterizes the mobility of the electrons and ions at the operating temperature of the fuel cell (600° C. to 1000° C.), then this ratio must be set greatly in favor of electrons for the BIP and greatly in favor of the ions (in particular oxygen ions) for the electrolyte layer.

Zirconium oxide (i.e., zirconium dioxide $ZrO_2$) is generally the material of choice for the electrolyte 14. The linear coefficient of thermal expansion of the electrolyte 14 must be compatible with the linear expansion of the BIPs 3, 4, in order to ensure that the overall assembly is stable and leakproof. The active layer structure K is thereby divided into a plurality of mutually adjacent units. The edge of the layer structure K, or of its units, is held in an inner assembly region B in such a way that the sub-chamber 12 consists of a plurality of mutually adjacent spaces which are each closed off gas-tightly from the sub-chamber 11.

The plates themselves may consist of an electrically conductive ceramic which is particularly tailored to the requirements of this field of application, of steel with high shape stability or of an alloy in which, for example, an oxide is dispersed. A particularly suitable example of an oxide dispersion alloy (ODS alloy) of this type is a chromium-based alloy containing 5% iron and 1% yttrium oxide ($Y_2O_3$), the chromium-iron alloy being essentially matched to the linear expansion of the electrolyte, while the oxide dispersed therein serves primarily to improve the corrosion properties of the alloy.

FIG. 1 also shows a feed port 15 for a gas which is fed into the gas conduits 10 that are perpendicular to the plane of the drawing. The gas is discharged via a non-illustrated discharge port. Correspondingly, the arrows 16, 16', 16" also indicate that the other gas is fed via the gas connection 17 into the channels between the contact segments 8, and thereby through the other sub-chambers of the active chambers, before being discharged through a discharge connector (which is not illustrated in FIG. 1) on the other side of the fuel cell. The water produced during the cold hydrogen-oxygen reaction is discharged from the fuel cell through these gas flows, together with the residual enthalpy of reaction which is not converted into electrical energy.

If the bipolar plates 3, 4 are not sufficiently insulated from one another by the segments 5, then internal electrical losses occur which can greatly impair the efficiency of the fuel cell. In order for internal electrical losses of this type not to exceed 1 per thousand (°/oo), sufficient insulation must be provided in the segments 5 of the outer assembly region A.

In addition, the fuel cell should have substantially no leaks through which one of the reaction partners can escape. It is customary to seal the fuel cell in the assembly region using a solder glass which is stable at high temperatures, but for a customary layer thickness of about 700 $\mu$m, the leaktightness of such a wide soldered gap raises considerable difficulties.

In particular, it raises technical difficulties of filling such wide soldering sites with solder material, without giving rise to internal stresses or even micro-cracks which could lead to a failure of the soldering sites, an aggravating factor being that sealing the soldering site requires a sintering process which is usually associated with a reduction in volume.

It is also difficult for solder glass, which fills a wide gap, to be sintered in such a way that the soldering material does not start to flow and gain access to regions of the active chamber in which it has a disruptive effect. A solder glass is generally an oxide powder (usually white) which is mixed with a binder (for example an organic binder), in order to permit controlled application of the soldering material. The soldering process itself is performed by heating, during which the organic binder escapes and the remaining oxide is fused or sintered and thereby forms a gas-impermeable amorphous filler.

The sintered amorphous filler has electron conductivity which, although it decreases with increasing temperature, cannot be ignored, especially if chromium oxide diffuses from the bipolar plate into the solder glass during the fusion or sintering process, for example. During the sintering, it is also possible for chromium oxide that has diffused in to be reduced and for chromium boride or other components which impair the insulation to be formed.

Vapors which are produced when the binder is burnt off or escapes may also be toxic and difficult to dispose of. For this reason, the amount of solder glass should be limited. The escaping binder can also damage other surfaces in the active chamber, in particular the sensitive electrode surfaces of the active layer structure.

It has therefore been proposed heretofore, instead of completely filling the gap width d with solder glass of this type, to solder a corresponding frame made of an electrically insulating ceramic (for example a spinel, $MgAl_2O_4$) into the soldering gap. Correspondingly, the assembly region according to the prior art thus comprises the layer sequence: BIP/solder glass/spinel/solder glass/BIP.

An oxide frame of this type, the height of which should be only a few 100 $\mu$m, nevertheless requires a large outlay on production and careful treatment. It can therefore only be used in the laboratory, and not under economic manufacturing conditions.

At the high operating temperatures, the surfaces of the BIPs forming the gas conduits on the cathode side of the electrolyte layer are also particularly sensitive. Indeed, oxygen corrosion may occur there in the alloy of the BIPs, in particular the formation of chromium oxide. For its part, the chromium oxide may, through solid-state diffusion, reach other components of the SOFC and damage them. Similarly, hydrogen corrosion or carbon corrosion may occur on the surface of the BIP on the anode side in the gas conduits, which may in the long term embrittle and destroy the corresponding contact segments.

SUMMARY OF THE INVENTION

It is accordingly an object of the invention to provide a fuel cell with ceramic-coated bipolar plates and a method of producing such a cell, which overcomes the above-mentioned disadvantages of the heretofore-known devices and methods of this general type and which makes it possible to seal the fuel cell in the assembly region in a gas-tight and electrically insulating fashion, in a simple manner which can be carried out economically on an industrial scale. In particular, is should be possible to achieve the required mechanical stability of the fuel cell in simple fashion. Additionally, it is an object of the invention to protect the fuel-cell surface exposed to the aggressive operating gases from chemical attack by these gases.

The basis of the invention is to protect the surface of a bipolar plate by an electrically insulating coating, at least in the regions in which diffusion processes may cause particular problems. For this protective layer, low electron mobility is thus required in addition to low permeability for the reaction gases and other neutral extraneous substances, while particularly low ion mobility is not necessary, since an electric field is a prerequisite for transport of such ions. The same properties (low transport numbers for electrons, high transport numbers for ions, in particular oxygen ions) are required in the selection of the electrolyte of the active layer structure, so that a crystalline oxide, as is suitable for the electrolyte, can also be used for the coating.

These provisions are aimed primarily at the assembly regions of the fuel cell. However, a protective layer of this type can equally well—as a diffusion barrier layer on the surfaces of the gas conduits—prevent aggressive operating gases from diffusing into the material of the BIPs.

A firmly adhering and impermeable coating of this type, made of electrically insulating crystalline ceramic, may, for example, comprise primarily zirconium oxide ($ZrO_2$) which is preferably stabilized by a stabilizing component (e.g. CaO, $Y_2O_3$, MgO, $CeO_2$, etc.). $Al_2O_3$ or the above-mentioned spinel or combinations of these components, may also be used as the coating material. The coating itself may also be built up in layers, for example with a thin bonding layer and a thicker cover layer. This is so because a highly adhering material may be applied economically only in thin layers, but a material which can be applied less expensively, exhibits poorer adhesion to the BIP surface.

A suitable adhesion base is, for example, NiCrAlY.

It is also sufficient for only the surface of one of the two plates to be coated and the opposite surface of the other plate to bear a less insulating material which is used only for gas-type filling of the remaining gap in the assembly region.

The coating material may, for example, be applied as a dispersion or colloid in a gel, which is subsequently dried in air and burnt into the surface. A screen printing process or wet powder spraying (WPS) is also possible, the material which is applied being subsequently burnt in in air and sintered.

It is likewise possible, especially with very thin layers, to produce a corresponding coating by chemical vapor deposition (CVD). Atmospheric plasma spraying (APS) or flame spraying with high jet pressure (for example 6 bar) and correspondingly high jet velocity are alternative processes allowing coating with the above-mentioned protective layers.

The thickness of the coating in the gas conduits is advantageously between about 30 and 50 $\mu$m. The thickness of the coating in the outer assembly region is advantageously between about 30 and 200 $\mu$m. While a solder glass contains grains of an amorphous oxide and, during soldering, is sintered to give an amorphous impermeable mass which lacks insulation, the coating comprises a dense crystalline ceramic in which virtually no electrical conduction takes place.

There is therefore provided, in accordance with the invention, a fuel cell with an active chamber and an oxidic solid electrolyte, comprising;

a pair of electrically conductive plates having surfaces facing toward one another and defining an active chamber therebetween; an ion-conducting active layer structure disposed between the plates and dividing the active chamber into sub-chambers lying one above the other and being closed off from one another; and an outer assembly region surrounding the active chamber;

a plurality of insulating segments disposed in the outer assembly region, the insulating segments laterally closing off the active chamber in gas-tight fashion and maintaining the plates at a given spacing distance from one another, the insulating segments comprising an impermeable coating firmly adhering to the surface of at least one of the plates in the outer assembly region, the impermeable coating insulating against electron conduction, and an impermeable filler filling a remaining gap between the surfaces of the plates;

the surfaces of the plates being profiled in a region of the active chamber and forming a contact segment contacting a respective electrode face of the ion-conducting active layer structure, and the profiled surfaces having gas conduits formed therein for feeding reactive gas through the sub-chambers.

According to one primary feature of the invention, the insulating segments of the fuel element are formed by a firmly adhering impermeable coating on the surfaces of the two plates in the assembly region of the fuel cell, the coating having an insulating effect against electron conduction, and the remaining gap between the coated surfaces being filled with an impermeable filler, in particular the above-mentioned solder glass. In this case, the coating advantageously consists of a crystalline ceramic whose transport number for electrons is substantially smaller (for example a factor of 0.01 or less) than for ions (in particular oxygen ions). An amorphous oxide (for example glass) is particularly suitable for the filler.

The segments accordingly consist, for example, of the layer sequence BIP/crystalline ceramic/amorphous oxide/ crystalline ceramic/BIP. In this case, it may be sufficient to provide just the surface of one of the two bipolar plates with the coating, which corresponds to the layer structure BIP/ crystalline ceramic/amorphous oxide/BIP.

The filler is, for example, a powder, in particular oxide powder (for example a solder glass) which originally contains a binder and is consolidated and virtually freed of binder by sintering. Thus, a sintered or fused sheet is preferably used. Sheets of this type are commercially available as solder glass green sheets and are particularly suitable for inexpensive construction of the fuel cell according to the invention.

With the above and other objects in view there is provided, in accordance with the invention, there is provided a firmly adhering coating of a crystalline ceramic disposed at least in the gas conduits, the coating being impermeable and resistant to corrosion by the reactive gas, and having a transport number for electrons which is substantially smaller than a transport number thereof for oxygen ions.

With the above objects in view there is further provided, in accordance with the invention, a method of producing a fuel cell with a given height and a given cross-sectional area, which comprises:

producing a plurality of profiled plates to be stacked one above the other at a given spacing distance and at least partly coating the plates;

producing a plurality of active layer structures for active chambers of the fuel cell;

forming foils of an amorphous oxide powder and a binder, the foils having a thickness greater than the given spacing distance in a finished fuel cell between the at least partly coated plates, having a cross-sectional area substantially corresponding to a cross-sectional area of the fuel cell, and having voids formed therein for receiving the the active layer structures;

stacking the plates, the active layer structure and the foils into a sandwich structure defining a plurality of vertically stacked active chambers, wherein each active layer structure is placed in a void of a respective foil between two plates; and sintering the sandwich structure until a height thereof reaches a given height of the fuel cell.

In other words, the profiled plates which are required as bipolar plates may first be provided and coated on the parts of their surface intended for the coating. Likewise, the active layer structure required for each active chamber is provided. A further starting material is a sheet which consists of an amorphous oxide powder held together by a binder and whose sheet thickness is greater than the distance between the at least partly coated surfaces of the plates which is intended for the finished fuel cell. Foils or sheets of this type can be manufactured in long webs which are subsequently cut up into individual sheets (sheet sections) in correspondence with the assembly regions of the fuel cell, that is to say their cross section corresponds approximately to the cross section of the fuel cell and they contain cut-out windows into which the active layer structures fit. The coated plates, the active layer structures and the sheet sections are then formed into a sandwich structure, in which the sheet sections are each placed between two plates, and the active layer structures in the free spaces of the sheet sections. The sandwich structure is then sintered until its height reaches the intended height of the fuel cell.

Other features which are considered as characteristic for the invention are set forth in the appended claims.

Although the invention is illustrated and described herein as embodied in a fuel cell with ceramic-coated bipolar plates and a method of producing such a cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
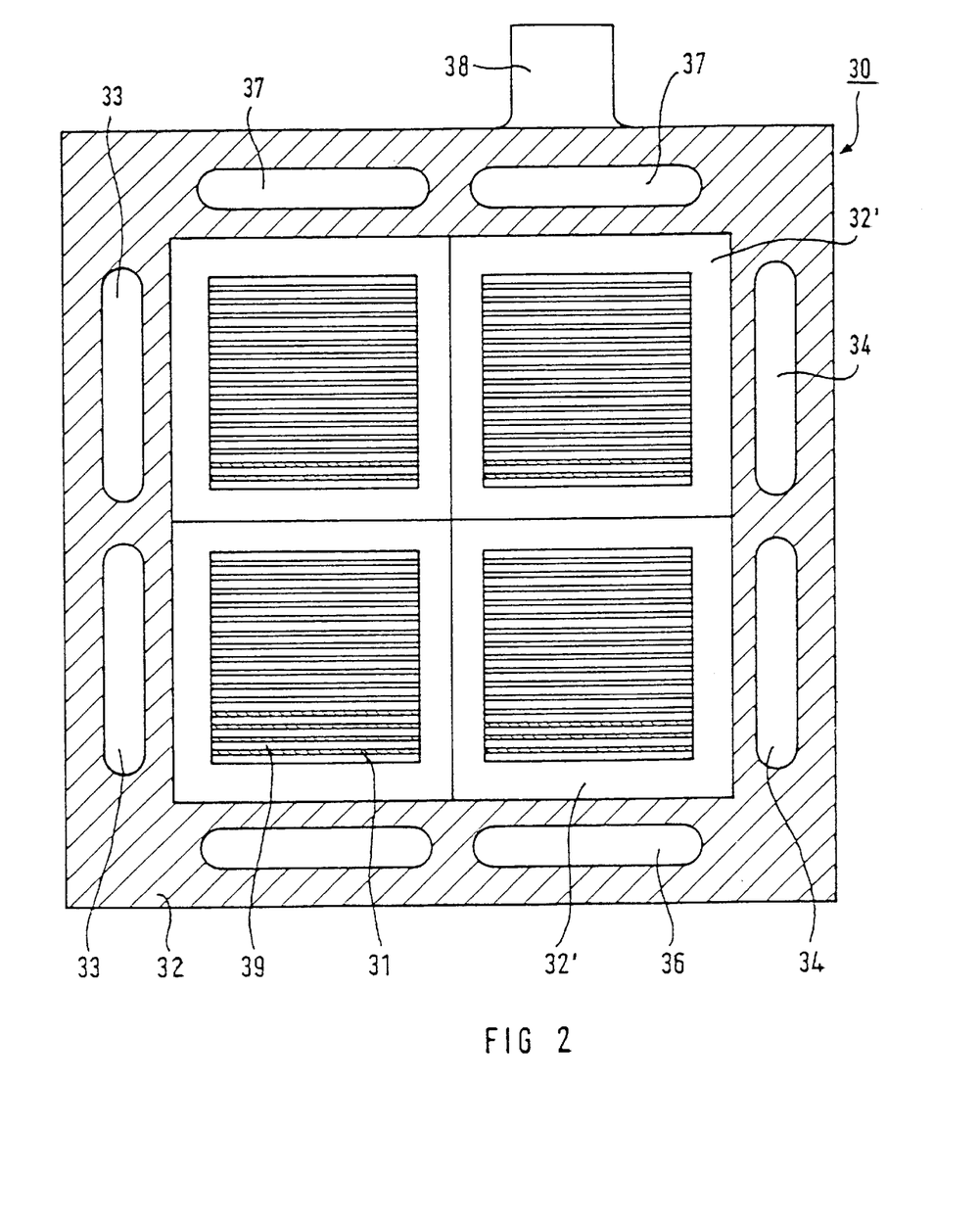
FIG. 2 is a plan view a bipolar plate with the coating on the surface.

The outer assembly region A, which represents the side edge of the fuel element and in which the bipolar plates are held at a mutual spacing distance d, has already been described above with reference to FIG. 1. FIG. 2 shows the plan view of a bipolar plate 30 of this type, which extends over the cross-section of the fuel element and, in this case, is composed of a plurality of parts soldered together: in the outer assembly region, the plate 30 contains a thickened edge 32, into which a metal sheet or a metal platelet is inserted, FIG. 2 showing four platelets 32' lying next to one another.

At least one surface of the thickened edge is, according to the invention, coated with a crystalline ceramic (mentioned above) which insulates substantially against electron conduction and which has a thickness of about 150 $\mu$m. The ceramic bears an impermeable filler. Longitudinal grooves 31 can be seen in the windows of the platelets 32' and are connected below the platelets 32' to supply channels 33 and discharge channels 34 and form gas conduits on one of the sides of the plate 30, while corresponding transverse grooves form gas conduits on the other side (not visible in FIG. 2) of the plate 30 which are connected to supply channels and discharge channels 36, 37. In this case, one of the gas connections 38 for these channels 36, 37 and the transverse grooves can also be seen, while the corresponding terminals which are arranged above and below on the fuel element for the channels 33, 34 are not visible.

The segments 39 extending between the longitudinal grooves or gas conduits 31 are not coated on their upper side. Instead, as contact segments, they form the electrically conductive contact for one of the electrodes of the active layer structure. Nevertheless, the surfaces of the longitudinal grooves or gas conduits 31 likewise bear a coating of the crystalline ceramic, the thickness of which is about 30 $\mu$m. The material of the plate 30 is essentially a chromium base alloy with 5% iron content.

Figure 3:
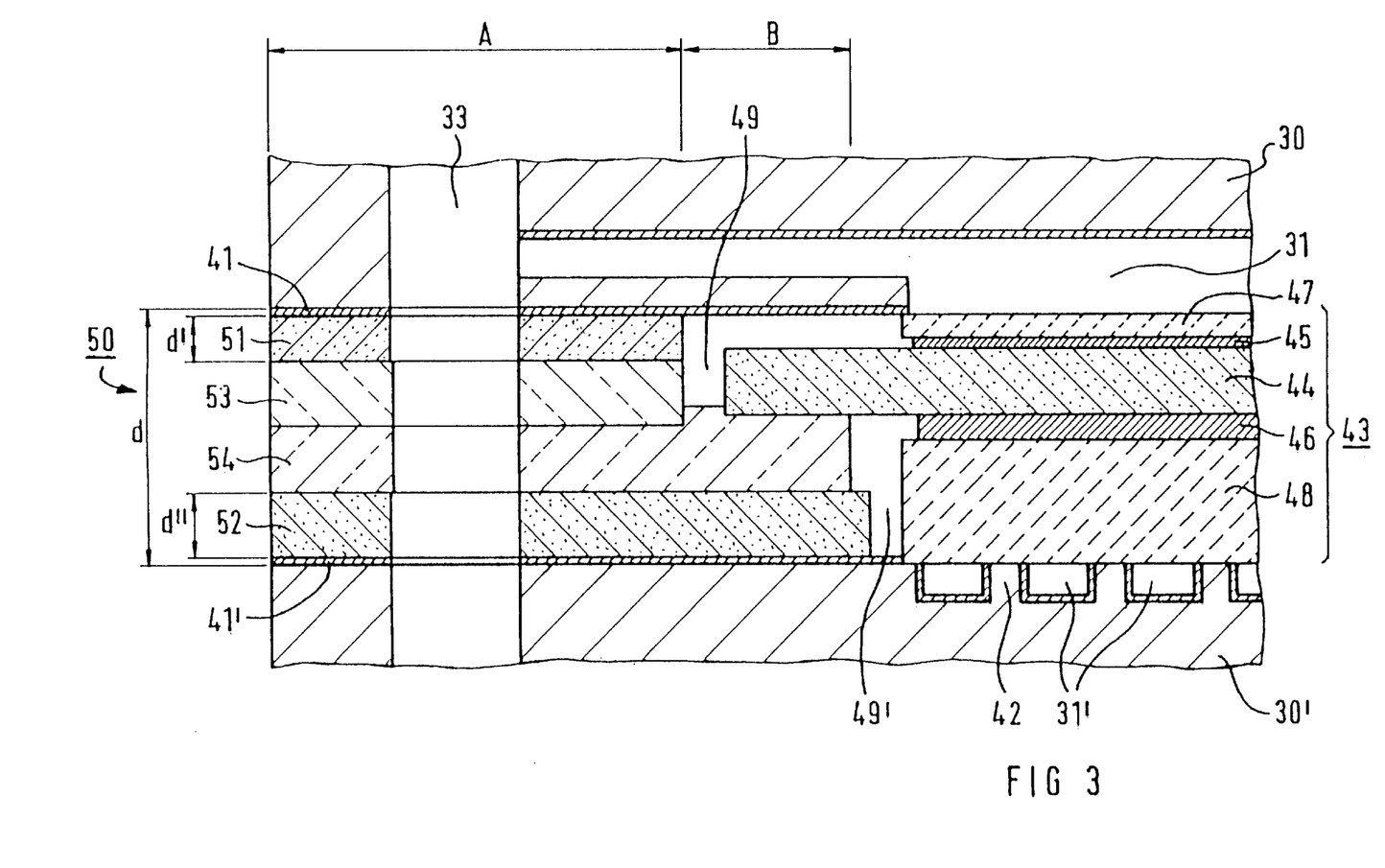
FIG. 3 is a partial section through the active chamber at the edge of the fuel cell according to the preferred embodiment.

FIG. 3 shows a cross section through the edge of the finished fuel cell. The bipolar plate 30 as well as the corresponding underlying bipolar plate 30' can be seen here. An oxygen-containing reaction gas is fed via the gas supply channels 33 to the longitudinal grooves or gas conduits 31, while a hydrogen-/carbon-containing reaction gas flows through the corresponding transverse grooves 31'.

The surfaces of the two bipolar plates 30, 30' are provided with the coating 41, 41' of crystalline ceramic. Only the segments 42 between the gas conduits are not coated on their outer side. The active structure 43, the essential part (layer 44) of which is formed by a ceramic solids ion conducting oxide, for example zirconium oxide ($ZrO_2$, stabilized by the addition of $Y_2O_3$), is applied to these outer sides. As is customary in the prior art, one electrode layer (cathode 45, anode 46) is arranged on both sides of this electrolyte layer 44, a functional layer 47, 48 being additionally provided in each case for balancing height differences and surface irregularities on these electrodes. The functional layer 48 may, for example, be a network-like metal-ceramic (so-called cermet) which, in the present case, is based on nickel.

A decisive property of this functional layer is that it has a very good conductivity for electrons, while the conductivity for ions plays a subordinate role. In contrast to the material of the electrolyte and of the coating 41, 41', the transport numbers for electrons are large, but as small as possible for ions.

The above-noted DE-A-42 37 602, which overlaps with the instantly disclosed invention substantially except for the coating of the BIP, proposes to spray the functional coating onto the surface of the BIP as well, i.e., onto the surfaces of the gas conduits.

The bipolar plates 30, 30' are held by a segment 50 which extends in a ring around the edge of the fuel cell, at a distance d (approximately 700 $\mu$m). This segment seals the sides of the fuel cell in gas-tight fashion and insulates the BIPs 30 and 30'. To this end, the surface of the BIP 30 is coated according to the invention with a protective layer of stabilized $ZrO_2$ (thickness d' of the protective layer about 100 $\mu$m), which provides a firmly adhering leakproof insulation layer. A corresponding protective layer 52 (thickness d" about 150 $\mu$m) is also located on the surface of the BIP 30'. The remaining space between the two protective layers 51 and 52 is, according to the invention, filled in this segment 50 (outer assembly region) with a fused or sintered solder glass which, in correspondence with the composition of the solder glass grains, forms a network structure of amorphous oxide.

This layer structure of the segment 50 prevents a current carried by electrons in the conduction band of the coating material. At the same time, during soldering, the protective layers prevent ions or other materials, which may increase the conductivity of the solder glass layer, from being able to diffuse from the plates 30, 30' into the segment. The solder glass layer 53 therefore has a low electrical conductivity, even at the operating temperature.

As shown by FIG. 3, the edge of the active layer structure 43 is fused into a layer 54, protruding from the outer assembly region A and its filler (solder glass 53) into the inner assembly region B, and is held on the surface of the BIP 30'. This also ensures that the active chamber, formed by the plates 30, 30' and the segments 50, is divided into an upper chamber 49, connected to the gas conduits 31, and a lower chamber 49', connected to the channels 31'. These chambers are closed off in gas-tight fashion from one another and they are connected via the electrolyte as the ion-conducting connection.

Figure 4:
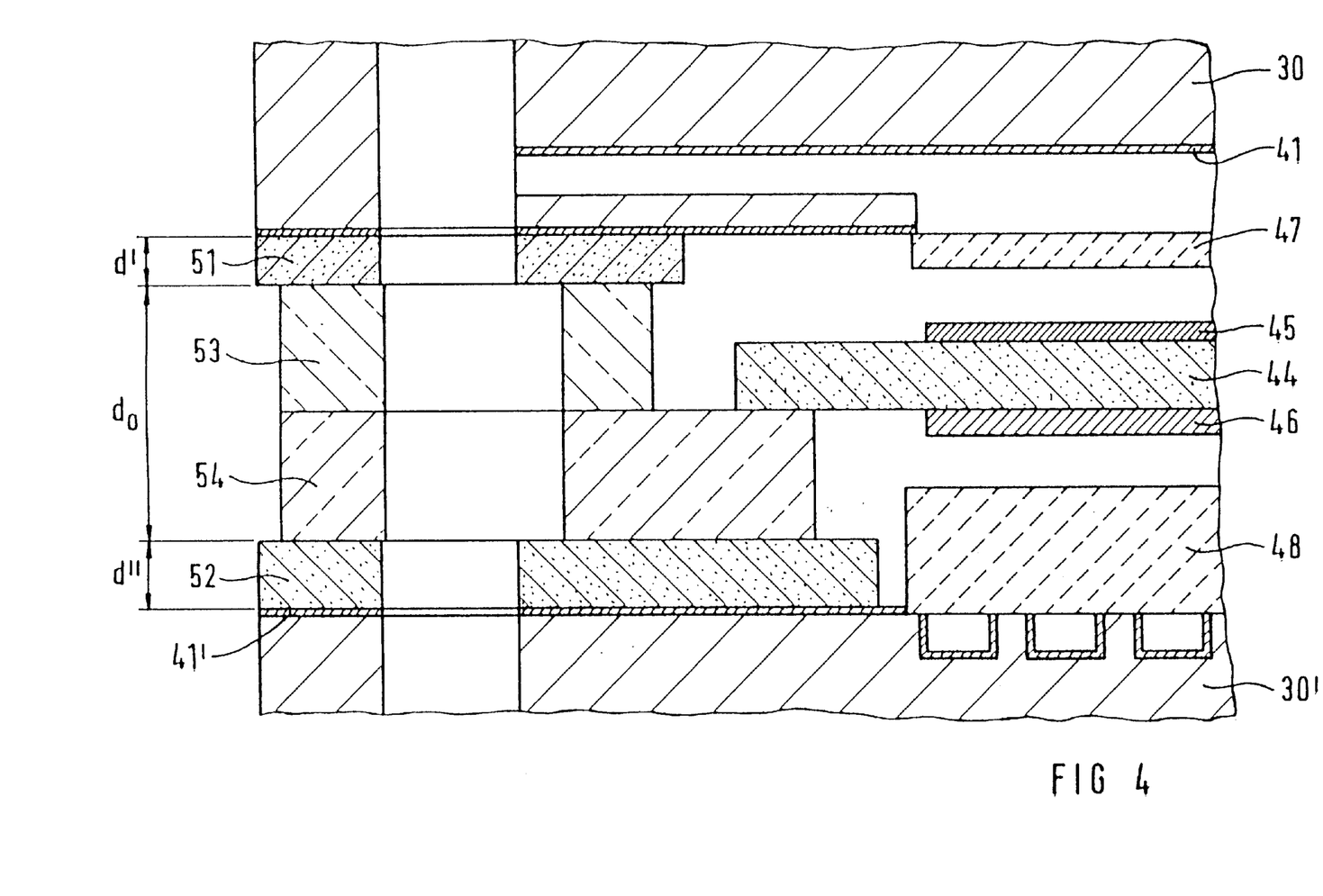
FIG. 4 is a similar view of the sandwich structure of the parts shown in FIG. 3, prior to final sintering.

During the end stage of the manufacture of the fuel cell, the sandwich structure shown in FIG. 4 is first stacked and then simply exposed to the temperatures which lead to solidification of the filler (53, 54 in FIG. 3). The sandwich structure includes the lower BIP 30', with the protective layers 41' and 52, as well as two sheets 53, 54, lying one above the other, which are cut from commercial, so-called solder glass green sheets (glass green foils). In these solder glass green sheets, the corresponding solder glass powder is bound by means of an organic binder which escapes at the soldering temperatures (800 to 1000° C.). The thickness of these sheets is chosen in such a way that the distance $d_0$ between the coated surfaces of the plates 30, 30' is greater than the amount intended for the finished fuel cell; this makes it possible, during a subsequent soldering process, for a volume reduction to take place in the soldering material as well, it is also being possible for the height of the solder layer to be reduced in favor of a greater width.

The two solder glass green sheets 53 and 54 contain cuts, forming windows, into which the individual layers of the active layer structure, and thus, in particular, the functional layers 47, 48 as well as the electrolyte layer 44 with the two electrode layers 45 and 46, can be fitted. The upper BIP 30 is applied after this. In this way, as many coated BIPs and green glass solder sheets are stacked on one another as are needed for the finished fuel cell to contain the desired number of active chambers lying above one another. The sandwich structure produced in this way is then soldered by corresponding heat-treatment.

By virtue of the invention, the amount of solder glass needed, and therefore of the binder contained therein, which generally includes toxic constituents, is reduced overall. The width of the gap to be filled with solder is reduced by the width of the two protective layers, as a result of which both the leaktightness and the strength of the assembly point is improved, and the danger of excess solder flowing into regions of the fuel cell where it may cause functional impairment, is substantially less or even completely avoided. Since the material (for example stabilized $ZrO_2$) of the protective layer adheres well to a high-density crystal structure in which virtually no dissolving and diffusion of interfering extraneous atoms (in particular chromium oxide) takes place, neither can the solder glass take up extraneous materials from the material of the BIP.

Tests with the fuel cell according to the invention have shown that the leaktightness and insulation of the assembly region is at least as good as with conventional fuel cells which contain a ceramic frame soldered with a high degree of outlay carefully between the surfaces of the plates in the assembly region.

The outlay for producing and processing the individual components is thereby reduced to a tolerable level, so that industrial production of the fuel cell is greatly simplified.

We claim:

1. A fuel cell with an active chamber and an oxidic solid electrolyte, comprising;
   a pair of electrically conductive plates having surfaces facing toward one another and defining an active chamber therebetween; said active chamber having sides; an ion-conducting active layer structure disposed between said plates and dividing said active chamber into sub-chambers lying one above the other and being closed off from one another; and an outer assembly region surrounding each of said sides of said active chamber;

an insulating segment disposed on each of said sides of said active chamber, each of said insulating segments laterally closing off said active chamber in gas-tight fashion and spacing said plates from one another, each of said insulating segments including an impermeable coating firmly adhering to the surface of at least one of said plates in said outer assembly region, said impermeable coating insulating against electron conduction, and an impermeable filler filling a remaining gap between said surfaces of said plates;

said surfaces of said plates being profiled in a region of said active chamber and forming a contact segment contacting a respective electrode face of said ion-conducting active layer structure, and said profiled surfaces having gas conduits formed therein for feeding reactive gas through said sub-chambers.

2. The fuel cell according to claim 1, wherein said filler is an amorphous oxide.

3. The fuel cell according to claim 1, wherein said filler is glass.

4. The fuel cell according to claim 2, wherein said filler is formed from a powder originally containing a binder and having been solidified and substantially completely freed from said binder by sintering.

5. The fuel cell according to claim 4, wherein said filler is a heat-treated foil.

6. The fuel cell according to claim 4, wherein said filler is a solder glass green sheet.

7. The fuel cell according to claim 1, wherein said insulating segments have a height of 500 to 1000 $\mu$m.

8. The fuel cell according to claim 1, wherein said insulating segments have a height of approximately 700 $\mu$m.

9. The fuel cell according to claim 1, wherein said coating is a crystalline ceramic having a transport number for electrons which is substantially smaller than a transport number thereof for ions.

10. The fuel cell according to claim 1, wherein said coating is a ceramic which is resistant to corrosion by the reactive gas.

11. The fuel cell according to claim 10, wherein said coating is applied to a respective surface of said plates in said outer assembly region and has a thickness of between 30 and 200 $\mu$m.

12. A fuel cell with an oxidic solid electrolyte, comprising:
   a pair of electrically conductive plates having surfaces facing toward one another and defining an active chamber therebetween; an ion-conducting active layer structure disposed between said plates and dividing said active chamber into sub-chambers lying one above the other and being closed off from one another; and an outer assembly region surrounding said active chamber;

a plurality of insulating segments disposed in said outer assembly region, said insulating segments laterally closing off said active chamber in gas-tight fashion and spacing said plates from one another;

said surfaces of said plates being profiled in a region of said active chamber and forming a contact segment contacting a respective electrode face of said ion-conducting active layer structure, and said profiled surfaces having gas conduits formed therein for feeding reactive gas through said sub-chambers, and a firmly adhering coating of a crystalline ceramic disposed in said gas conduits, said coating being impermeable and resistant to corrosion by the reactive gas, and having a transport number for electrons which is substantially smaller than a transport number thereof for oxygen ions.

13. The fuel cell according to claim 12, wherein said coating has a thickness approximately between 30 and 50 μm.

14. The fuel cell according to claim 12, wherein said active layer structure has a side edge held in an inner assembly region, one of said surfaces of said plates being coated in the inner assembly region with a firmly adhering crystalline ceramic coating, and including impermeable additional filler disposed on said ceramic coating.

15. The fuel cell according to claim 12, wherein said crystalline ceramic is a ceramic selected from the group consisting of zirconium oxide, aluminum oxide and spinel.

16. The fuel cell according to claim 15, wherein said crystalline ceramic is stabilized by a stabilizing component.

17. The fuel cell according to claim 15, wherein said crystalline ceramic is burnt into the surface of said plate in air.

18. The fuel cell according to claim 12, wherein said plates are highly heat-resistant steel plates.

19. The fuel cell according to claim 12, wherein said plates are formed of a chromium-based alloy containing an oxide dispersion.

20. The fuel cell according to claim 12, wherein said plates are conductive ceramic plates.

21. In a method of producing a fuel cell with an oxidic solid electrolyte, wherein an active chamber is formed by placing a pair of electrically conductive plates with surfaces one above the other, disposing an ion-conducting active layer structure between the plates and dividing the active chamber into sub-chambers with the active layer structure, and surrounding the active chamber with an outer assembly region formed by a plurality of insulating segments laterally closing off the active chamber in gas-tight fashion and spacing the plates from one another, the improvement which comprises:

firmly adhering an impermeable and corrosion-resistant coating to the surface of at least one of the plates with a coating process selected from the group consisting of atmospheric plasma spraying, flame spraying, high-pressure flame spraying, coating with a gel containing a coloidal solution of coating material and subsequently firing in air, applying coating material with screen printing and subsequently firing in air, spraying coating material on as a wet powder and subsequently firing in air, and depositing coating material by chemical vapor deposition.

22. A method of producing a fuel cell with a height and a cross-sectional area, which comprises:

producing a plurality of profiled plates to be stacked one above the other and spaced apart from one another, producing a plurality of active layer structures for active chambers of the fuel cell;

forming foils of an amorphous oxide powder and a binder, the foils having a thickness greater than a spacing in a finished fuel cell between the at least partly coated plates, having a cross-sectional area substantially corresponding to a cross-sectional area of the fuel cell, and having voids formed therein for receiving the the active layer structures;

stacking the plates, the active layer structure and the foils into a sandwich structure defining a plurality of vertically stacked active chambers, wherein each active layer structure is placed in a void of a respective foil between two plates; and sintering the sandwich structure until a height thereof reaches a given height of the fuel cell.

* * * * *